(12) United States Patent
Hong et al.

(10) Patent No.: US 10,999,577 B2
(45) Date of Patent: May 4, 2021

(54) QUANTIZATION PARAMETER DETERMINATION METHOD AND IMAGE CAPTURE APPARATUS

(71) Applicant: HANWHA TECHWIN CO., LTD., Seongnam-si (KR)

(72) Inventors: Kyung Pyo Hong, Seongnam-si (KR); Sujit Kumar Mahapatro, Seongnam-si (KR); Yun Seok Kwon, Seongnam-si (KR); Hee Gyu Baek, Seongnam-si (KR)

(73) Assignee: HANWHA TECHWIN CO., LTD., Suwon-si (KR)

( * ) Notice: Subject to any disclaimer, the term of this patent is extended or adjusted under 35 U.S.C. 154(b) by 0 days.

(21) Appl. No.: 16/517,817

(22) Filed: Jul. 22, 2019

(65) Prior Publication Data

US 2019/0342554 A1 Nov. 7, 2019

Related U.S. Application Data

(63) Continuation of application No. 15/417,456, filed on Jan. 27, 2017, now Pat. No. 10,362,307.

(30) Foreign Application Priority Data

Sep. 9, 2016 (KR) .................. 10-2016-0116763
Nov. 2, 2016 (KR) .................. 10-2016-0145210

(51) Int. Cl.
*H04N 19/114* (2014.01)
*H04N 19/124* (2014.01)
(Continued)

(52) U.S. Cl.
CPC ............. *H04N 19/124* (2014.11); *H04N 7/18* (2013.01); *H04N 19/114* (2014.11);
(Continued)

(58) Field of Classification Search
CPC .................. H04N 19/114; H04N 19/124–126
See application file for complete search history.

(56) References Cited

U.S. PATENT DOCUMENTS

| 5,374,958 A | 12/1994 | Yanagihara |
| 5,398,078 A * | 3/1995 | Masuda ............... H04N 19/176 348/699 |

(Continued)

FOREIGN PATENT DOCUMENTS

| EP | 0720385 A2 | 7/1996 |
| EP | 0720385 A3 | 7/1996 |

(Continued)

OTHER PUBLICATIONS

Yonemaya et al., "MPEG Encoding Algorithm with Scene Adaptive Dynamic GOP Structure," 1999, p. 297-302 (Year: 1999).*

(Continued)

*Primary Examiner* — Robert J Hance
(74) *Attorney, Agent, or Firm* — Sughrue Mion, PLLC (57) ABSTRACT

A method of determining a quantization parameter includes determining an adjustment range of a quantization parameter correction value based on a size of a motion area of an input image, calculating an average bitrate value of the input image, and adjusting the quantization parameter correction value by decreasing the quantization parameter correction value within the adjustment range in response to determining that the average bitrate value is greater than an upper limit value, and by increasing the quantization parameter correction value within the adjustment range in response to determining that the average bitrate value is equal to or less than a lower limit value.

16 Claims, 6 Drawing Sheets

(51) Int. Cl.
*H04N 19/126* (2014.01)
*H04N 19/139* (2014.01)
*H04N 19/137* (2014.01)
*H04N 19/146* (2014.01)
*H04N 7/18* (2006.01)
*H04N 5/232* (2006.01)

(52) U.S. Cl.
CPC ......... *H04N 19/126* (2014.11); *H04N 19/137* (2014.11); *H04N 19/139* (2014.11); *H04N 19/146* (2014.11); *H04N 5/23229* (2013.01)

(56) References Cited

U.S. PATENT DOCUMENTS

| | | | |
|---|---|---|---|
| 5,959,672 A | 9/1999 | Sasaki | |
| 6,118,817 A * | 9/2000 | Wang | H04N 19/147 375/240.03 |
| 2002/0163964 A1 * | 11/2002 | Nichols | H04N 19/176 375/240.03 |
| 2005/0152449 A1 * | 7/2005 | Nemiroff | H04N 19/196 375/240.03 |
| 2007/0025444 A1 * | 2/2007 | Okada | H04N 19/17 375/240.16 |
| 2008/0165852 A1 * | 7/2008 | Zhang | H04N 19/124 375/240.16 |
| 2009/0161697 A1 * | 6/2009 | Wang | H04N 21/234354 370/538 |
| 2013/0301706 A1 | 11/2013 | Qiu et al. | |
| 2015/0195527 A1 * | 7/2015 | Zhou | H04N 19/70 375/240.02 |
| 2016/0119588 A1 * | 4/2016 | Ostby | H04N 7/183 348/143 |
| 2016/0127679 A1 * | 5/2016 | Farre Guiu | H04L 65/607 348/441 |
| 2016/0277759 A1 * | 9/2016 | Edpalm | H04N 19/162 |
| 2017/0208328 A1 * | 7/2017 | Kuusela | H04N 19/59 |

FOREIGN PATENT DOCUMENTS

| | | |
|---|---|---|
| KR | 10-0930344 B1 | 12/2009 |
| KR | 10-1086724 B1 | 11/2011 |
| KR | 10-2014-0072668 A | 6/2014 |
| KR | 10-1547252 B1 | 8/2015 |

OTHER PUBLICATIONS

Lee et al., "Adaptive Intra-Frame Assignment and Bit-Rate Estimation for Variable GOP Length in H.264," Oct. 2006, IEEE Transaction on Circuits and Systems for Video Technology, vol. 16 No. 10, p. 1271-1279 (Year: 2006).*

Matsuoka et al., "Coding Efficiency Improvement with Adaptive GOP Size Selection for H.264/SVC," 2008, The 3rd International Conference on Innovative Computing Information and Control (ICICIC'08) (Year: 2008).*

Yaacoub et al., "Content Adaptive Gop Size Control With Feedback Channel Suppression in Distributed Video Coding," ICIP 2009, p. 1397-1400 (Year: 2009).*

Communication dated Sep. 18, 2017, issued by the European Patent Office in counterpart European Patent Application No. 17164290.3.

* cited by examiner

QUANTIZATION PARAMETER DETERMINATION METHOD AND IMAGE CAPTURE APPARATUS

CROSS-REFERENCE TO THE RELATED APPLICATION

This is a Continuation Application of U.S. application Ser. No. 15/417,456 filed Jan. 27, 2017, which claims priority from and the benefit of Korean Patent Application Nos. 10-2016-0116763, filed on Sep. 9, 2016, and 10-2016-0145210, filed on Nov. 2, 2016, in the Korean Intellectual Property Office. The entire disclosures of the prior applications are considered part of the disclosure of the accompanying Continuation application, and are hereby incorporated by reference.

BACKGROUND

1. Field

Apparatuses and methods consistent with exemplary embodiments relate to a quantization parameter determination method and an image capture apparatus.

2. Description of the Related Art

Many surveillance cameras are installed in an increasing number of places, and technologies to record, store, and transmit images captured by surveillance cameras have been developed.

Recently, as the number of installed surveillance cameras has increased, efficient use of surveillance cameras and network resources is demanded.

SUMMARY

One or more exemplary embodiments provide a method for determining a quantization parameter suitable for an input image and an image capture apparatus.

One or more exemplary embodiments provide a method for determining a quantization parameter, by which resources may be efficiently used through precise adjustment of a quantization parameter, and an image capture apparatus.

One or more exemplary embodiments provide a method for determining a quantization parameter, by which a natural output image may be generated even when a size of a motion area in an input image is rapidly changed, and an image capture apparatus.

Various aspects of the inventive concept will be set forth in part in the description which follows and, in part, will be apparent from the description, or may be learned by practice of the exemplary embodiments.

According to one or more exemplary embodiments, there is provided a method of determining a quantization parameter including: determining an adjustment range of a quantization parameter correction value based on a size of a motion area of an input image, calculating an average bitrate value of the input image, and adjusting the quantization parameter correction value by decreasing the quantization parameter correction value within the adjustment range in response to determining that the average bitrate value is greater than an upper limit value, and by increasing the quantization parameter correction value within the adjustment range in response to determining that the average bitrate value is equal to or less than a lower limit value The method may further include determining a quantization parameter based on at least one of a quantization parameter default value and the quantization parameter correction value.

The quantization parameter default value may be determined based on at least one of a resolution of the input image, a frame rate of the input image, and a preset target bitrate value.

In the adjusting of the quantization parameter correction value, the quantization parameter correction value may be maintained constant in response to determining that the average bitrate value is greater than the lower limit value and equal to or less than the upper limit value.

Each of the lower limit value and the upper limit value may be determined based on at least one of a resolution of the input image, a frame rate of the input image, the average bitrate value of the input image, a preset target bitrate value, and the quantization parameter correction value.

In the determining of the adjustment range of the quantization parameter correction value, the input image may be classified into any one of one or more motion types based on the size of the motion area, and an adjustment range corresponding to the classified motion type may be determined to be the adjustment range of the quantization parameter correction value.

The one or more motion types may include a first type in which the size of the motion area is equal to or less than a first threshold size, a second type in which the size of the motion area is greater than the first threshold size and less than a second threshold size that is greater than the first threshold size, and a third type in which the size of the motion area is equal to or greater than the second threshold size. An adjustment range corresponding to the second type may include an adjustment range corresponding to the first type. An adjustment range corresponding to the third type may include the adjustment range corresponding to the second.

Maximum values of the adjustment ranges corresponding to the first type, the second type, and the third type may be the same.

In the adjusting of the quantization parameter correction value, in response to determining that a second adjustment range is narrower than a first adjustment range at a second time point, the quantization parameter correction value may be adjusted to be equal to a smallest value among values belonging to the second adjustment range, the first adjustment range may be an adjustment range at a first time point, and the second adjustment range may be an adjustment range at a second time point that is later than the first time point.

In the calculating of the average bitrate value of the input image, the average bitrate value may be calculated based on an average of bitrate values of the input image in a certain time period.

According to one or more exemplary embodiments, there is provided an image capture apparatus including: a controller configured to determine a quantization parameter correction value based on a size of a motion area of an input image and an average bitrate value, wherein the controller is further configured to determine an adjustment range of a quantization parameter correction value based on the size of the motion area of the input image, decrease the quantization parameter correction value within the adjustment range in response to determining that the average bitrate value is greater than an upper limit value, and increase the quantization parameter correction value within the adjustment range in response to determining that the average bitrate value is equal to or less than a lower limit value.

The controller may determine a quantization parameter based on at least one of a quantization parameter default value and the quantization parameter correction value.

The quantization parameter default value may be determined based on at least one of a resolution of the input image, a frame rate of the input image, and a preset target bitrate value.

The controller may maintain the quantization parameter correction value constant in response to determining that the average bitrate value is greater than the lower limit value and equal to or less than the upper limit value.

Each of the lower limit value and the upper limit value may be determined based on at least one of a resolution of the input image, a frame rate of the input image, the average bitrate value of the input image, a preset target bitrate value, and the quantization parameter correction value.

The controller may classify the input image into any one of one or more motion types based on the size of the motion area, and determine an adjustment range corresponding to the classified motion type to be the adjustment range of the quantization parameter correction value.

The one or more motion types may include a first type in which the size of the motion area is equal to or less than a first threshold size, a second type in which the size of the motion area is greater than the first threshold size and less than a second threshold size that is greater than the first threshold size, and a third type in which the size of the motion area is equal to or greater than the second threshold size. An adjustment range corresponding to the second type may include an adjustment range corresponding to the first type. An adjustment range corresponding to the third type may include the adjustment range corresponding to the second.

The maximum values of the adjustment ranges corresponding to the first type, the second type, and the third type may be the same.

In response to determining that a second adjustment range is narrower than a first adjustment range at a second time point, the controller may adjust the quantization parameter correction value to be equal to a smallest value among values belonging to the second adjustment range, the first adjustment range may be an adjustment range at a first time point, and the second adjustment range may be an adjustment range at a second time point that is later than the first time point.

The image capture apparatus may further include an image analysis unit configured to generate information about the size of the motion area of the input image.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments which are illustrated in the accompanying drawings. In this regard, the exemplary embodiments may have different forms and should not be construed as being limited to the descriptions set forth herein. Accordingly, the exemplary embodiments are merely described below with reference to the figures, to explain aspects of the inventive concept. Like reference numerals in the drawings denote like elements, and thus their description will be omitted.

As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first," "second," etc. may be used herein to describe various components, these components should not be limited by these terms. These components are only used to distinguish one component from another. As used herein, the singular forms "a," "an" and "the" are intended to include the plural forms as well, unless the context clearly indicates otherwise. It will be further understood that the terms "including," "having," and "comprising" used herein specify the presence of stated features or components, but do not preclude the presence or addition of one or more other features or components. Sizes of components in the drawings may be exaggerated for convenience of explanation.

Exemplary embodiments of the inventive concept may be described in terms of functional block components and various processing operations. Such functional blocks may be realized by any number of hardware and/or software components configured to perform the specified functions. For example, the exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the inventive concept may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments could employ any number of conventional techniques for electronics configuration, signal processing and/or control, data processing and the like. The words "mechanism," "element," "means," and "configuration" are used broadly and are not limited to mechanical or physical embodiments, but may include software routines in conjunction with processors, etc.

Figure 1:
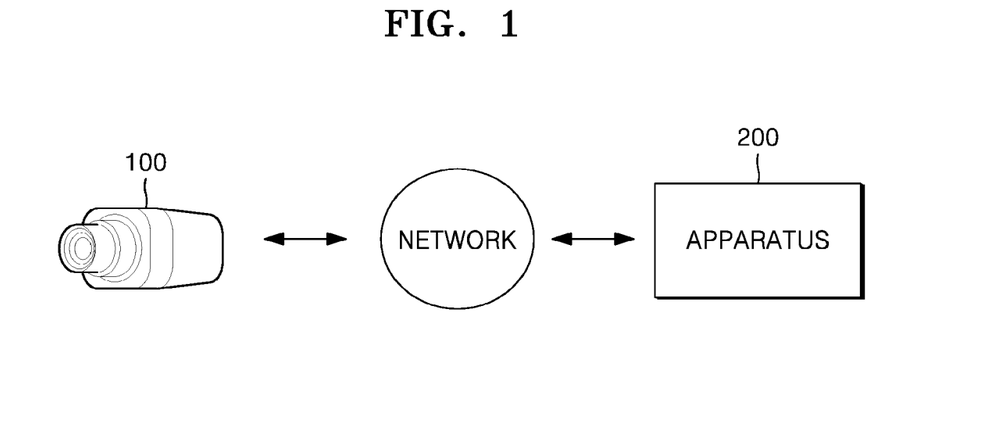
FIG. 1 is a schematic diagram of an image system according to an exemplary embodiment.

FIG. 1 is a schematic diagram of an image system according to an exemplary embodiment.

Referring to FIG. 1, the image system according to the exemplary embodiment may include an image capture apparatus 100 and an apparatus 200.

The apparatus 200 according to the exemplary embodiment may be one of various types of apparatuses capable of receiving an image obtained by the image capture apparatus 100. For example, the apparatus 200 may be any one of a video management system (VMS), a central management system (CMS), a network video recorder (NVR), and a digital video recorder (DVR). Also, the apparatus 200 may be a personal computer (PC) or a mobile terminal. However, this is merely an example and is not limited thereto. Any apparatus capable of receiving an image obtained by the image capture apparatus 100 through a network, and displaying and/or storing the received image, may be used as the apparatus 200 without limitation.

A network may connect the image capture apparatus 100 to the apparatus 200. For example, the network may provide a path through which an image obtained by the image capture apparatus 100 is transmitted to the apparatus 200. The network may include, for example, wired networks such as local area networks (LANs), wide area networks (WANs), metropolitan area networks (MANs), and integrated service digital networks (ISDNs) or wireless networks such as wireless LANs, CDMA, Bluetooth, satellite communication, but is not limited thereto.

The image capture apparatus 100 according to the exemplary embodiment may obtain an image and transmit the obtained image to the apparatus 200. The image capture apparatus 100 may determine a quantization parameter based on the size of a motion area of an input image and an average bitrate value of the input image.

Figure 2:
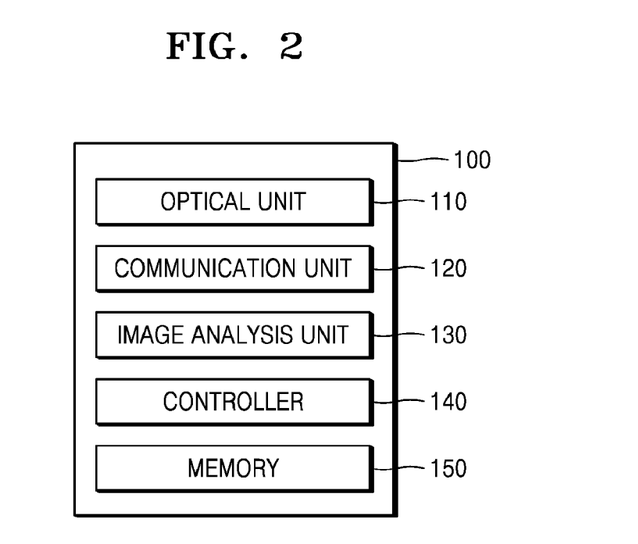
FIG. 2 is a block diagram of a structure of an image capture apparatus according to an exemplary embodiment.

FIG. 2 is a block diagram of a structure of the image capture apparatus 100 according to an exemplary embodiment.

Referring to FIG. 2, the image capture apparatus 100 according to the exemplary embodiment may include an optical unit 110, a communication unit 120, an image analysis unit 130, a controller 140, and a memory 150.

The optical unit 110 may include a lens for converting light into an electric signal and an image sensor. The lens may be a lens group including one or more lenses. The image sensor may convert an image input through the lens to an electric signal. For example, the image sensor may be a semiconductor device, such as a charge-coupled device (CCD) or a complementary metal oxide semiconductor (CMOS), to be capable of converting an optical signal to an electrical signal.

The communication unit 120 may be an apparatus including hardware and software needed for transceiving a signal such as a control signal or a data signal through a wired/wireless connection to other network apparatus, but is not limited thereto.

The image analysis unit 130 may analyze an input image and generate information about the size of a motion area. For example, the image analysis unit 130 may detect an object from the input image by using a motion area detecting method. The motion area detecting method is not specifically limited and thus various techniques such as a Gaussian mixture model (GMM) or a codebook mode may be employed.

The controller 140 may obtain the input image from the optical unit 110 and generate an output image based on the input image. The controller 140 may include all kinds of apparatuses, such as processors, capable of processing data. The "processor" may mean, for example, a data processing apparatus included in hardware and having a circuit physically structured to execute codes or instructions included in a program. As such, the data processing apparatus included in hardware may include processing apparatuses, for example, a microprocessor, a central processing unit (CPU), a processor core, a multiprocessor, an application-specific integrated circuit (ASIC), or a field programmable gate array (FPGA), but is not limited thereto.

In the exemplary embodiment, the controller 140 may be an encoder that controls the size of a quantization parameter correction value based on the size of the motion area of the input image and the average bitrate value of the input image. The controller 140 may include the above-described encoder. However, this is merely an example and is not limited thereto.

The memory 150 temporarily or permanently stores data, instructions, programs, program codes, which are processed by the controller 140, or a combination thereof. The memory 150 may include a magnetic storage media or a flash storage media, but is not limited thereto. The memory 150 may temporarily or permanently store the input image obtained by the image capture apparatus 100, in addition to the data and instructions processed by the controller 140. Also, the memory 150 may temporarily or permanently store an output image generated by the controller 140.

The controller 140 according to the exemplary embodiment may determine an adjustment range of the quantization parameter correction value based on the size of the motion area of the input image.

The "input image" may mean at least one frame constituting an image. For example, in the case of an input frame having a frame rate of 30 frames per second (fps), all of thirty (30) frames for one second may be input images.

Also, the "input image" may mean frames having a certain interval. If an input image has a frame rate of 30 fps, first, eleventh, and twenty-first frames for one second may correspond to the input images. However, this is merely an example and is not limited thereto.

The "motion area" may mean an area of the input image where a motion occurred.

Figure 3A:
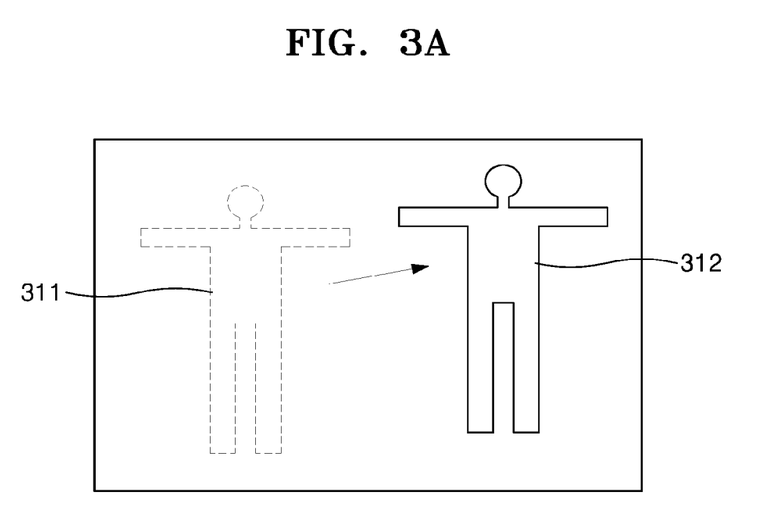
FIGS. 3A and 3B are diagrams for explaining a method of generating information about the size of a motion area by using an image analysis unit, according to an exemplary embodiment.
Figure 3B:
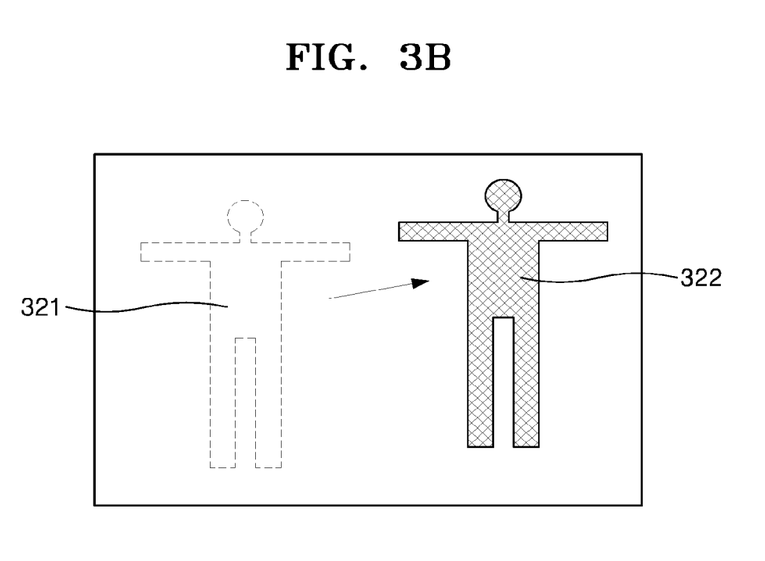

FIGS. 3A and 3B are diagrams for explaining a method of generating information about the size of a motion area by using the image analysis unit 130, according to an exemplary embodiment.

Referring to FIG. 3A, it is assumed that an object is moved from a left position 311 to a right position 312. In this state, the image analysis unit 130 may determine whether a particular object in an image is moved and a motion position, by comparing two frames of the input image. For example, the image analysis unit 130 may determine whether an object in an image is moved and a motion position, by comparing two consecutive frames. Also, the image analysis unit 130 may perform the determination by comparing two frames having a certain interval.

FIG. 3B illustrates an example of a motion area determined by the image analysis unit 130.

As described above in FIG. 3A, it is assumed that an object is moved from the left position 311 to the right position 312. In this case, the image analysis unit 130 may determine an area 322 corresponding to the right position 312 of FIG. 3A that is a current position of the object to be the motion area. Also, the image analysis unit 130 may determine an area 321 corresponding to the left position 311 of FIG. 3A that is a previous position of the object to be the motion area. Furthermore, the image analysis unit 130 may determine both of the areas 321 and 322 to be the motion area. However, this is merely an example and is not limited thereto.

The image analysis unit 130 may generate information about the size of a motion area based on the determined motion area. For example, the image analysis unit 130 may calculate a ratio of the number of pixels belonging to the motion area to the number of pixels belonging to an entire frame and generate the information about the size of the motion area including the calculated ratio. Also, the image analysis unit 130 may generate information about the size of the motion area including the number of pixels belonging to the motion area. However, this is merely an example and is not limited thereto.

The controller 140 according to the exemplary embodiment may determine the adjustment range of the quantization parameter correction value based on the information about the size of the motion area generated by the image analysis unit 130.

Herein, a term "quantization parameter correction value", a term "quantization parameter default value", and a term "quantization parameter" are used as distinctive concepts.

The term "quantization parameter correction value" may be a value varying according to time based on the size of the motion area of the input image and the average bitrate value. In contrast, the term "quantization parameter default value" may be a value that does not vary according to time based on the size of the motion area of the input image and the average bitrate value. The term "quantization parameter default value" may be determined based on at least one of a resolution of the input image, a frame rate of the input image, and a preset target bitrate value.

The term "quantization parameter" may be a value based on at least one of the "quantization parameter correction value" and the "quantization parameter default value". For example, the term "quantization parameter" may be a value obtained by summing the "quantization parameter correction value" and the "quantization parameter default value". Accordingly, the term "quantization parameter" may also be a value that varies according to time based on the size of the motion area of the input image, the frame rate of the input image, and the average bitrate value.

In the determination of a quantization parameter, if only one of the size of a motion area and the average bitrate value is taken into consideration, the quantization parameter may be inappropriately determined.

For example, if the quantization parameter is determined by considering the average bitrate only, the quantization parameter is determined to be small even when no motion occurs in an image having high complicacy (image having a high average bitrate value) so that resources are unnecessarily consumed.

Also, in the determination of a quantization parameter, even when both of the size of a motion area and the average bitrate value are taken into consideration, the quantization parameter is adjusted in a method of selecting any one of preset several values, for example, four values of 10, 20, 25, and 35 in the H.264/AVC standard technology so that precise adjustment of the quantization parameter is impossible.

In the exemplary embodiment, the quantization parameter default value is determined according to the rough characteristics of the input image and the quantization parameter correction value is determined based on the size of a motion area and the average bitrate value, and the quantization parameter is determined based on the determined two values. Accordingly, the quantization parameter may be determined to be more suitable for the input image.

In the exemplary embodiment, the term "adjustment range of a quantization parameter correction value" may mean a range in which the above-described quantization parameter correction value may be adjusted.

As an alternative exemplary embodiment, the controller 140 may determine the length of a group of picture (GOP) based on the information about the size of the motion area generated by the image analysis unit 130. The GOP may mean a set of consecutive frames.

For example, if the motion area is relatively large, the controller 140 may determine the length of GOP to be short. In other words, the controller 140 may generate an image corresponding to a fast motion by setting the length of GOP to be short with respect to an image having a large motion.

In contrast, if the motion area is relatively small, the controller 140 may determine the length of GOP to be long. In other words, the controller 140 sets the length of GOP to be long with respect to an image having a small motion so that the resources and/or storage space may be more efficiently used.

Figure 4:
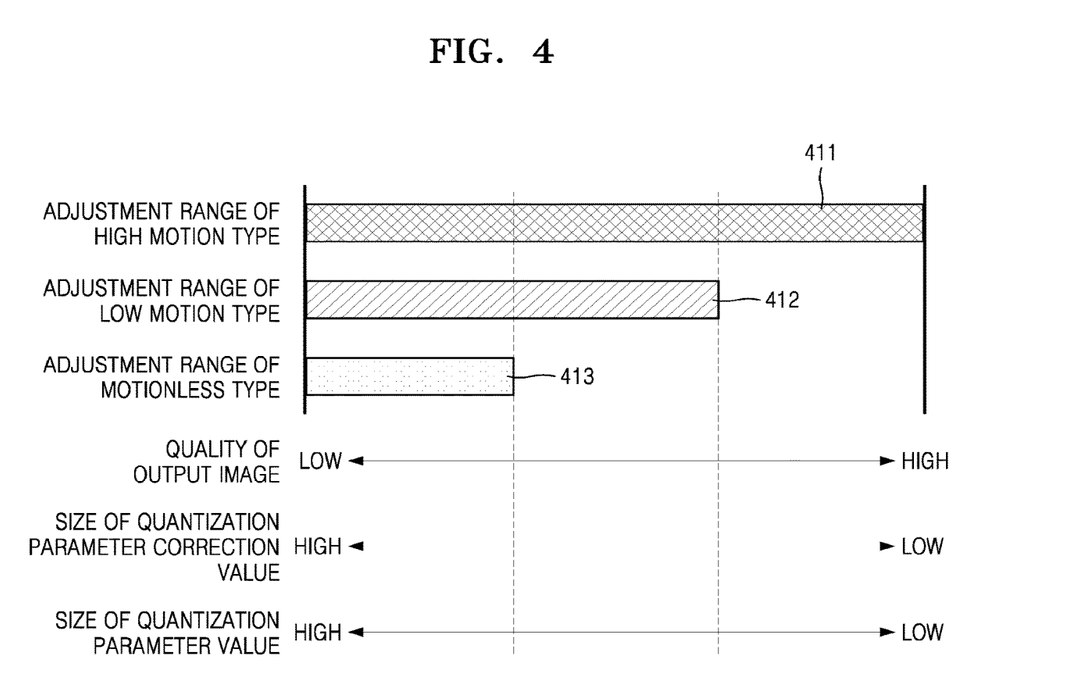
FIG. 4 is a diagram for explaining an adjustment range of a quantization parameter correction value.

FIG. 4 is a diagram for explaining the adjustment range of a quantization parameter correction value.

The controller 140 may classify the input image into any one of one or more motion types, based on the information about the size of the motion area generated by the image analysis unit 130. Also, the controller 140 may determine an adjustment range corresponding to the motion type into which the input image is classified, to be the adjustment range of a quantization parameter correction value.

For example, the controller 140 may classify the input image into any one of a first type in which the size of a motion area is equal to or less than a first threshold size, a second type in which the size of a motion area is greater than the first threshold size and less than a second threshold size that is greater than the first threshold size, and a third type in which the size of a motion area is equal to or greater than the second threshold size.

For example, it is assumed that the image analysis unit 130 calculates a ratio of the number of pixels belonging to the motion area with respect to the number of pixels belonging to an entire frame and generates the information about the size of the motion area including the calculated ratio. Also, the controller 140 classifies the input image into any one of a "high motion type", a "low motion type", and a "motionless type", in which threshold values of the ratio of a motion area for classifying the input image into one of the types are assumed to be 0.3 and 0.7.

In this state, if the image analysis unit 130 determines the ratio of a motion area of the input image to be 0.8, the controller 140 may classify the input image into the "high motion type". Also, the controller 140 may determine an adjustment range 411 corresponding to the "high motion type" that is one type of the input image to be the adjustment range of a quantization parameter correction value. Furthermore, the controller 140 may determine the length of GOP to be a minimum length.

If the image analysis unit 130 determines the ratio of a motion area of input image to be 0.1, the controller 140 may classify the input image into the "motionless type" and determine an adjustment range 413 corresponding thereto to be the adjustment range of a quantization parameter correction value. In this case, the controller 140 may determine the length of GOP to be the maximum length.

the controller 140 may classify the input image having the ratio of a motion area of equal to or greater than 0.3 and less than 0.7 into the "low motion type" and determine an adjustment range 412 corresponding thereto to be the adjustment range of a quantization parameter correction value. In this case, the controller 140 may determine the length of GOP to be the minimum length or an intermediate length.

In the exemplary embodiment, the "maximum", "minimum", and "intermediate" lengths of GOP may denote preset specific length values. For example, the maximum, intermediate, and minimum lengths of GOP may denote "60", "30", and "15", respectively.

As illustrated in FIG. 4, the adjustment range 412 corresponding to the "low motion type" may include the adjustment range 413 corresponding to the "motionless type". Similarly, the adjustment range 411 corresponding to the "high motion type" may include the adjustment range 412 corresponding to the "low motion type". Furthermore, the maximum values of the adjustment ranges corresponding to the "motionless type", the "low motion type", and the "high motion type" may be the same.

Also, referring to FIG. 4, as the quantization parameter correction value decreases, the size of a quantization parameter decreases and quality of an output image increases. In contrast, as the quantization parameter correction value increases, the size of a quantization parameter increases and the quality of an output image decreases.

In other words, if the input image is classified into the "high motion type", the quality of an output image may vary from low quality to high quality, and as the input image has small motion, the quality of an output image may decrease.

Thus, according to the inventive concept, since an image such as a large motion image necessary user's precise check is output as a high quality image and an image such as a motionless image necessary user's rough check is output as a low quality image, resources may be more efficiently used.

The controller 140 may calculate an average bitrate value of the input image. In this state, the controller 140 may calculate an average bitrate value with an average of bitrates values of the input image in a certain time section. For example, in the case of an input image having a bitrate of 30 fps, the controller 140 may calculate an average bitrate value with an average of bitrate values of consecutive three frames. Also, the controller 140 may calculate an average bitrate value with an average bitrate of thirty frames for one second. However, this is merely an example and is not limited thereto.

The controller 140 may adjust the quantization parameter correction value by comparing the calculated average bitrate value with certain values.

For example, if the calculated average bitrate value is greater than an upper limit value, the controller 140 may decrease the quantization parameter correction value within the adjustment range.

If the calculated average bitrate value is equal to or less than a lower limit value, the controller 140 may increase the quantization parameter correction value within the adjustment range.

If the calculated average bitrate value is greater than the lower limit value and equal to or less than the upper limit value, the controller 140 may maintain the quantization parameter correction value constant.

In this state, the controller 140 may determine the lower limit value and the upper limit value based on at least one of the resolution of the input image, the frame rate of the input image, the average bitrate value of the input image, the preset target bitrate value, and the quantization parameter correction value.

If a second adjustment range is narrower than a first adjustment range at a second time point, the controller 140 may adjust the quantization parameter correction value to be the smallest value of values belonging to the second adjustment range. In this state, the first adjustment range is an adjustment range at the first time point and the second adjustment range is an adjustment range at the second time point that is later than the first time point. In other words, if the size of a motion area decreases and thus the adjustment range of a quantization parameter correction value becomes narrower, the controller 140 may adjust the quantization parameter correction value to be the smallest value among the values belonging to a new adjustment range.

Thus, according to the inventive concept, even when a size of a motion area in the input image is rapidly changed, a natural output image may be generated.

Figure 5:
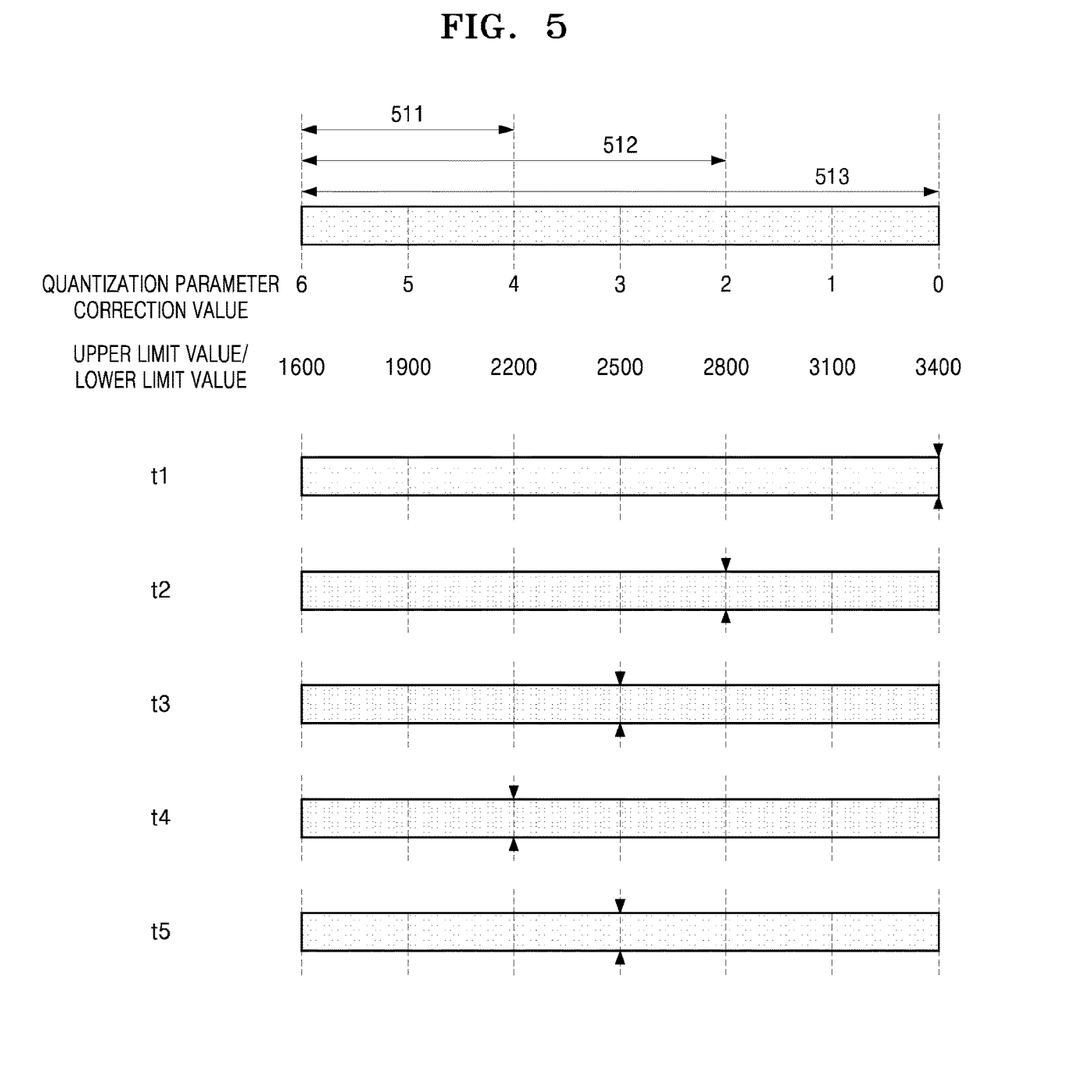
FIG. 5 is a diagram illustrating an example of adjusting a quantization parameter correction value by comparing, via a controller, a calculated average bitrate value with certain values.

FIG. 5 is a diagram illustrating an example of adjusting a quantization parameter correction value by comparing, via the controller 140, a calculated average bitrate value with certain values.

Referring to FIG. 5, it is assumed that the quantization parameter correction value may be adjusted to be any one of a total of seven values of 0 to 6, and the upper limit value and the lower limit value corresponding to each quantization parameter correction value are the same as illustrated. Also, it is assumed that the controller 140 classifies the input image into any one of the "high motion type", the "low motion type", and the "motionless type", and adjustment ranges 513, 512, and 511 corresponding to the respective types are the same as illustrated. Finally, it is assumed that the controller 140 classifies the input image into the "high motion type" at a time point t1, and thus, the controller 140 determines the quantization parameter correction value to be 0 among the seven values.

Based on the above-described assumption, if the size of the motion area of the input image decreases at a time point t2, the controller 140 classifies the input image into the "low motion type", and thus, the quantization parameter correction value may be adjusted to be 2. In other words, as the adjustment range 512 at the time point t2 that is a current time point becomes narrower than the adjustment range 513 at the time point t1 that is a previous time point, the controller 140 may adjust the quantization parameter correction value to be 2 that is the smallest value among the values belonging to the adjustment range 512 at the current time point.

Also, if the average bitrate value decreases to 2300 at a time point t3, the controller 140 may increase the quantization parameter correction value within the adjustment range 512 because the reduced bitrate value is equal to or less than the lower limit value "2500". In detail, the controller 140 may compare the upper limit value "3100" and the lower limit value "2500" respectively corresponding to the correction values 1 and 3 adjacent to the quantization parameter correction value "2" at the time point t2, with the average bitrate value, and adjust the quantization parameter correction value to be 3 because the average bitrate value is smaller than the lower limit value "2500". If the average bitrate value is 2600 in the same condition, the controller 140 may maintain the quantization parameter correction value to be 2 that is the current value. Also, if the average bitrate value is 3500 in the same condition, which is greater than the upper limit value "3100", since the smallest value in the adjustment range of a quantization parameter correction value is 2, the controller 140 may maintain the quantization parameter correction value to be 2.

Although the average bitrate value is maintained to be 2300 at a time point t4, if the size of a motion area decreases and thus the controller 140 classifies the input image into the "motionless type", the controller 140 may adjust the quantization parameter correction value to be 4. In other words, since the adjustment range 511 at the time point t4 that is the current time point becomes narrower than the adjustment range 512 at the time point t3 that is the previous time point, the controller 140 may adjust the quantization parameter correction value to be 4 that is the smallest value among the values belonging to the adjustment range 511, at the current time point.

If the average bitrate value increases to 2700 at a time point t5, the size of a motion area increases and thus the controller 140 classifies the input image into the "low motion type", the controller 140 may adjust the quantization parameter correction value to be 3.

In the above-described exemplary embodiment, since the adjustment range at the current time point becomes narrower than the adjustment range at the previous time point, the controller 140 adjusts the quantization parameter correction value to be the smallest value among the values belonging to the adjustment range at the current time point.

On the contrary, if the adjustment range at the current time point becomes wider than the adjustment range at the previous time point, the controller 140 may compare the average bitrate value "2300" at the current time point with the upper limit value "2500" and the lower limit value "1900" according to the above-described method in FIGS. 1 to 4, and adjust the quantization parameter correction value according to a result of the comparison.

In the case of the time point t5, since the average bitrate value "2700" is greater than the upper limit value "2500", the controller 140 may adjust, that is, decrease, the quantization parameter correction value to 3 within a current adjustment range.

Also, if the average bitrate value is maintained to be 2300 at the time point t5, the controller 140 may maintain the quantization parameter correction value to be 4.

As such, according to the inventive concept, the quantization parameter correction value may be dynamically adjusted considering both of the size of a motion area and the average bitrate value.

The controller 140 may determine a quantization parameter based on at least one of the quantization parameter correction value and the quantization parameter default value. Also, the controller 140 may generate an output image based on the determined quantization parameter.

Figure 6:
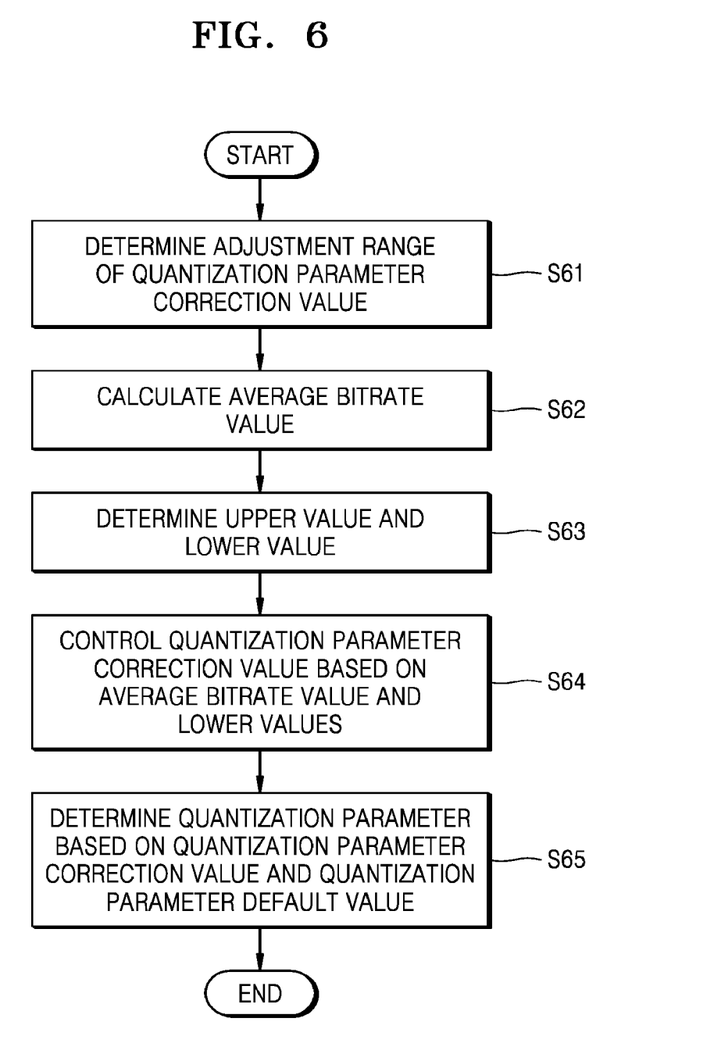
FIGS. 6 and 7 are flowcharts for explaining a quantization parameter determination method performed by an image capture apparatus, according to an exemplary embodiment.
Figure 7:
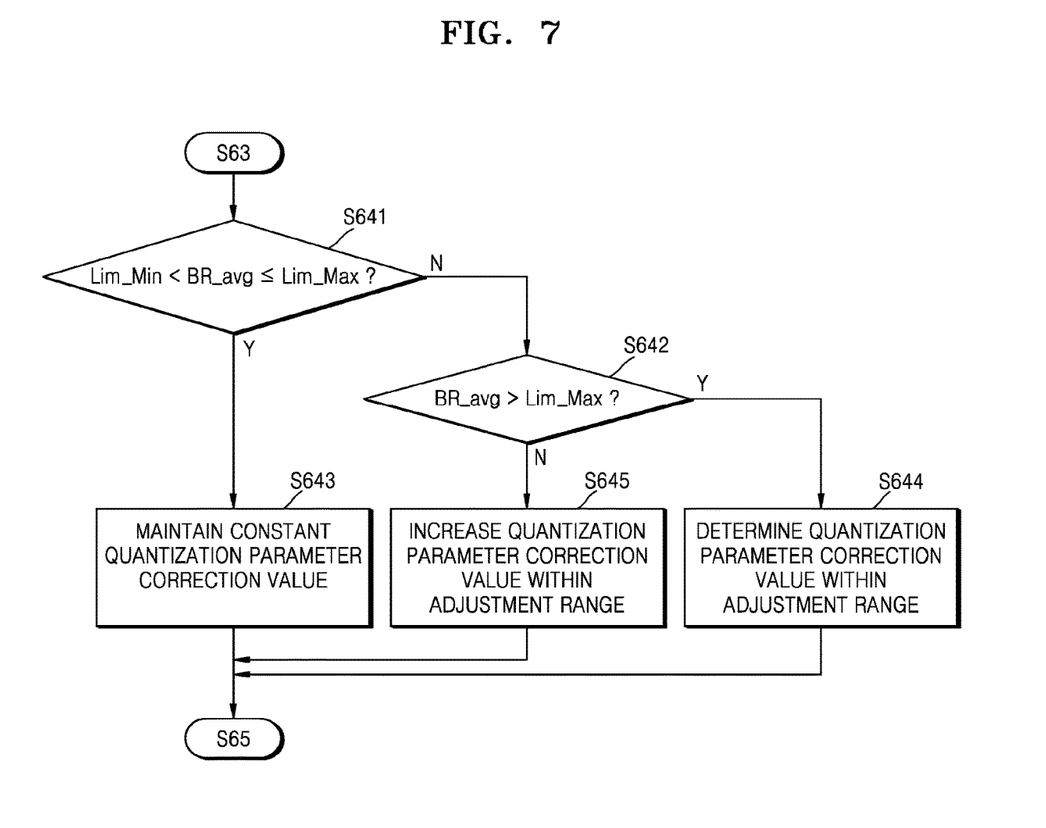

FIGS. 6 and 7 are flowcharts for explaining a quantization parameter determination method performed by the image capture apparatus 100, according to an exemplary embodiment.

The controller 140 may determine an adjustment range of a quantization parameter correction value based on the information about the size of the motion area generated by the image analysis unit 130 (operation S61). In detail, the controller 140 may classify the input image into any one of one or more motion types based on the information about the size of the motion area generated by the image analysis unit 130. Also, the controller 140 may determine an adjustment range corresponding to the motion type into which the input image is classified to be the adjustment range of a quantization parameter correction value.

For example, the controller 140 may classify the input image into any one of a first type in which the size of a motion area is equal to or less than a first threshold size, a second type in which the size of a motion area is between the first threshold size and a second threshold size that is greater than the first threshold size, and a third type in which the size of a motion area is equal to or greater than the second threshold size.

For example, it is assumed that the image analysis unit 130 calculates a ratio of the number of pixels belonging to the motion area with respect to the number of pixels belonging to an entire frame and generates the information about the size of the motion area including the calculated ratio. Also, the controller 140 classifies the input image into any one of a "high motion type", a "low motion type", and a "motionless type", in which threshold values of the ratio of a motion area for classifying the input image into one of the types are assumed to be 0.3 and 0.7.

In this state, if the image analysis unit 130 determines the ratio of a motion area of the input image to be 0.8, the controller 140 may classify the input image into the "high motion type". Also, the controller 140 may determine an adjustment range corresponding to the "high motion type" that is one type of the input image to be the adjustment range of a quantization parameter correction value.

If the image analysis unit 130 determines the ratio of a motion area of input image to be 0.1, the controller 140 may classify the input image into the "motionless type" and determine an adjustment range corresponding thereto to be the adjustment range of a quantization parameter correction value.

The controller 140 may classify the input image having the ratio of a motion area of equal to or greater than 0.3 and less than 0.7 into the "low motion type" and determine an adjustment range corresponding thereto to be the adjustment range of a quantization parameter correction value.

In this state, the adjustment range corresponding to the "low motion type" may include the adjustment range corresponding to the "motionless type". Similarly, the adjustment range corresponding to the "high motion type" may include the adjustment range corresponding to the "low motion type". Furthermore, the maximum values of the adjustment ranges corresponding to the "motionless type", the "low motion type", and the "high motion type" may be the same.

The controller 140 may calculate an average bitrate value of the input image (operation S62). In this state, the controller 140 may calculate an average bitrate value with an average of bitrate values of the input image in a certain time section. For example, in the case of an input image having a bitrate of 30 fps, the controller 140 may calculate the average bitrate value with an average of bitrate values of consecutive three frames. Also, the controller 140 may calculate the average bitrate value with an average bitrate of thirty frames for one second. However, this is merely an example and is not limited thereto.

The controller 140 may determine the lower limit value and the upper limit value based on at least one of the resolution of the input image, the frame rate of the input image, the average bitrate value of the input image, the preset target bitrate value, and the quantization parameter correction value (operation S63).

Next, the controller 140 may adjust the quantization parameter correction value by comparing the calculated average bitrate value with certain values (operation S64).

In detail, referring to FIG. 7, the controller 140 determines whether an average bitrate value BR_Avg is greater than a lower limit value Lim_Min and the average bitrate value BR_Avg is equal to or less than an upper limit value Lim_Max (operation S641). If the above conditions are met, the controller 140 maintains the quantization parameter correction value the same (operation S643). If the conditions are not met in operation S641, the controller 140 determines whether the average bitrate value BR_Avg is greater than the upper limit value Lim_Max (operation S642). If the condition is met, the controller 140 decreases the quantization parameter correction value within an adjustment range (operation S644). If the condition is not met in operation S642, the controller 140 increases the quantization parameter correction value within the adjustment range (operation S645).

Also, if a second adjustment range is narrower than a first adjustment range at a second time point, the controller 140 may adjust the quantization parameter correction value to be the smallest value among the values belonging to the second adjustment range. In this state, the first adjustment range is an adjustment range at the first time point and the second adjustment range is an adjustment range at the second time point that is later than the first time point. In other words, if the size of a motion area decreases and thus the adjustment range of a quantization parameter correction value becomes narrower, the controller 140 may adjust the quantization parameter correction value to be the smallest value among the values belonging to a new adjustment range.

Thus, according to the inventive concept, even when a size of a motion area in the input image is rapidly changed, a natural output image may be generated.

It is assumed that the quantization parameter correction value may be adjusted to be any one of a total of seven values of 0 to 6, and the upper limit value and the lower limit value corresponding to each quantization parameter correction value are the same as illustrated. Also, it is assumed that the controller 140 classifies the input image into any one of the "high motion type", the "low motion type", and the "motionless type", and the adjustment ranges 513, 512, and 511 corresponding to the respective types are the same as illustrated in FIG. 5. Finally, it is assumed that the controller 140 classifies the input image into the "high motion type" at the time point t1, and thus, the controller 140 determines the quantization parameter correction value to be 0 among the seven values.

Based on the above-described assumption, if the size of the motion area of the input image decreases at the time point t2, the controller 140 classifies the input image into the "low motion type", and thus, the quantization parameter correction value may be adjusted to be 2. In other words, as the adjustment range 512 at the time point t2 that is the current time point becomes narrower than the adjustment range 513 at the time point t1 that is the previous time point, the controller 140 may adjust the quantization parameter correction value to be 2 that is the smallest value among the values belonging to the adjustment range 512 at the current time point.

Also, if the average bitrate value decreases to 2300 at the time point t3, the controller 140 may increase the quantization parameter correction value within the adjustment range 512 because the reduced bitrate value is equal to or less than the lower limit value "2500". In detail, the controller 140 may compare the upper limit value "3100" and the lower limit value "2500" respectively corresponding to the correction values 1 and 3 adjacent to the quantization parameter correction value "2" at the time point t2, with the average bitrate value, and adjust the quantization parameter correction value to be 3 because the average bitrate value is smaller than the lower limit value "2500". If the average bitrate value is 2600 in the same condition, the controller 140 may maintain the quantization parameter correction value to be 2 that is the current value. Also, when the average bitrate value is 3500 in the same condition, which is greater than the upper limit value "3100", since the smallest value in the adjustment range of a quantization parameter correction value is 2, the controller 140 may maintain the quantization parameter correction value to be 2.

Although the average bitrate value is maintained to be 2300 at the time point t4, if the size of a motion area decreases and thus the controller 140 classifies the input image into the "motionless type", the controller 140 may adjust the quantization parameter correction value to be 4. In other words, since the adjustment range 511 at the time point t4 that is the current time point becomes narrower than the adjustment range 512 at the time point t3 that is the previous time point, the controller 140 may adjust the quantization parameter correction value to be 4 that is the smallest value among the values belonging to the adjustment range 511, at the current time point.

If the average bitrate value increases to 2700 at the time point t5, the size of a motion area increases and thus the controller 140 classifies the input image into the "low motion type", the controller 140 may adjust the quantization parameter correction value to be 3.

In the above-described exemplary embodiment, since the adjustment range at the current time point becomes narrower than the adjustment range at the previous time point, the controller 140 adjusts the quantization parameter correction value to be the smallest value among the values belonging to the adjustment range at the current time point.

On the contrary, if the adjustment range at the current time point becomes wider than the adjustment range at the previous time point, the controller 140 may compare the average bitrate value "2300" at the current time point with the upper limit value "2500" and the lower limit value "1900" according to the above-described method in FIGS. 1 to 4, and adjust the quantization parameter correction value according to a result of the comparison.

In the case of the time point t5, since the average bitrate value "2700" is greater than the upper limit value "2500", the controller 140 may adjust, that is, decrease, the quantization parameter correction value to 3 within a current adjustment range.

Also, if the average bitrate value is maintained to be 2300 at the time point t5, the controller 140 may maintain the quantization parameter correction value to be 4.

As such, according to the inventive concept, the quantization parameter correction value may be dynamically adjusted considering both of the size of a motion area and the average bitrate value.

Then, the controller 140 may determine the quantization parameter based on at least one of the quantization parameter correction value and the quantization parameter default value (operation S65).

As such, the quantization parameter default value is determined according to the rough characteristics of the input image and the quantization parameter correction value is determined based on the size of a motion area and the average bitrate value, and the quantization parameter is determined based on the determined two values. Accordingly, the quantization parameter may be determined to be more suitable for the input image.

The quantization parameter determination method according to an exemplary embodiment can also be embodied as computer-readable codes on a computer-readable recording medium. The computer-readable recording medium includes any kind of recording device for storing data that can be read by a computer system. Examples of the computer-readable recording medium include magnetic media, e.g., hard disks, floppy disks, and magnetic tapes, optical media, e.g., compact disc read only memories (CD-ROMs) and digital versatile disks (DVDs), magneto-optical media, e.g., floptical disks, and hardware device configured to store and execute program commands, for example, programming modules, e.g., read only memories (ROMs), random access memories (RAMs), flash memories. Also, the program command may include not only machine codes created by a compiler but also high-level language codes executable by a computer using an interpreter. The above-described hardware apparatuses may be configured to operate as one or more software modules to perform operations according to various exemplary embodiments, or vise versa. Furthermore, the medium may include intangible medium implemented to be capable of transmitting on a network. For example, the medium may be implemented in the form of software or application so as to be transmitted and distributed via a network.

The computer program may be specially designed and configured for the inventive concept or may be well known to one skilled in the art of computer software, to be usable. An example of a computer program may include not only machine codes created by a compiler but also high-level language codes executable by a computer using an interpreter.

At least one of the components, elements, modules or units represented by a block as illustrated in FIG. 2 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The particular implementations shown and described herein are illustrative examples of the inventive concept and are not intended to otherwise limit the scope of the inventive concept in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

Accordingly, this is not intended to limit the inventive concept to particular modes of practice, and it is to be appreciated that all changes, equivalents, and substitutes that do not depart from the spirit and technical scope of the present inventive concept are encompassed in the inventive concept.

As described above, in the quantization parameter determination method and the image capture apparatus according to the exemplary embodiment, since an image such as a large motion image necessary user's precise check is output as a high quality image and an image such as a motionless image necessary user's rough check is output as a low quality image, resources may be more efficiently used.

Furthermore, in the quantization parameter determination method and the image capture apparatus according to the exemplary embodiment, even when a size of a motion area in the input image is rapidly changed, a natural output image may be generated.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An image capturing apparatus comprising:
an image sensor to provide an input video stream; and
at least one processor configured to:
detect at least one moving object in an input video of the input video stream;
determine a size of an area of a motion of the at least one moving object in the input video;
determine a length of a group of pictures based on the size;
encode the input video as a set of encoded frames, wherein a number of the encoded frames is determined based on the length of the group of pictures,
wherein the length of the group of pictures is determined as a first length based on the size being a first size, and the length of the group of pictures is determined as a second length shorter than the first length based on the size being a second size larger than the first size.

2. The image capturing apparatus of claim 1, wherein the size is determined based on a ratio of a number of pixels associated with the motion of the at least one moving object to a number of pixels associated with an entire frame.

3. The image capturing apparatus of claim 1, wherein the at least one processor is further configured to:
select a motion type of the input video from a plurality of motion types based on the size; and
determine the length of the group of pictures based on the selected motion type.

4. The image capturing apparatus of claim 3, wherein the plurality of motion types include a first motion type and a second motion type, and
wherein the at least one processor is further configured to:
select the motion type of the input video as the first motion type based on the size being equal to or less than a threshold size; and
select the motion type of the input video as the second motion type based on the size being greater than the threshold size.

5. The image capturing apparatus of claim 4, wherein the first size is equal to or less than the threshold size,
wherein the second size is greater than the threshold size, and
wherein the at least one processor is configured to:
determine the length of the group of pictures as the first length in response to selection of the first motion type; and
determine the length of the group of pictures as the second length in response to selection of the second motion type.

6. The image capturing apparatus of claim 1, wherein the length of the group of pictures decreases as the size increases.

7. The image capturing apparatus of claim 1, wherein the length of the group of pictures is determined based on comparison between the size and a threshold size.

8. A method of processing an input video stream, the method comprising:
detecting at least one moving object in an input video of the input video stream;
determine a size of an area of a motion of the at least one moving object in the input video;
determine a length of a group of pictures based on the size; and
encode the input video as a set of encoded frames, wherein a number of the encoded frames is determined based on the length of the group of pictures,
wherein the length of the group of pictures is determined as a first length based on the size being a first size, and the length of the group of pictures is determined as a second length shorter than the first length based on the size being a second size larger than the first size.

9. The method of claim 8, wherein the size is determined based on a ratio of a number of pixels associated with the motion of the at least one moving object to a number of pixels associated with an entire frame.

10. The method of claim 8, wherein the determining the length of the group of pictures comprises:
selecting a motion type of the input video from a plurality of motion types based on the size; and
determining the length of the group of pictures based on the selected motion type.

11. The method of claim 10, wherein the plurality of motion types include a first motion type and a second motion type, and
wherein the selecting the motion type of the input video comprises:
selecting the motion type of the input video as the first motion type based on the size being equal to or less than a threshold size; and
selecting the motion type of the input video as the second motion type based on the size being greater than the threshold size.

12. The method of claim 11, wherein the first size is equal to or less than the threshold size,
wherein the second size is greater than the threshold size, and
wherein the determining the length of the group of pictures based on the selected motion type comprises:
determining the length of the group of pictures as the first length in response to selection of the first motion type; and
determining the length of the group of pictures as the second length in response to selection of the second motion type.

13. The method of claim 8, wherein the length of the group of pictures decreases as the size increases.

14. An image capturing apparatus comprising:
an image sensor configured to provide an input video stream; and
at least one processor configured to:
detect at least one moving object in an input video of the input video stream;
determine a motion degree based on a motion of the at least one moving object in the input video;
adjust, based on the motion degree, a range of a quantization parameter correction value for the input video; and
encode at least a portion of the input video depending on a quantization parameter determined based on the quantization parameter correction value selected from within the range, and a quantization parameter default value.

15. The image capturing apparatus of claim 14, wherein the motion degree comprises a size of an area of the motion of the at least one moving object.

16. The image capturing apparatus of claim 14, wherein the motion degree is determined based on a ratio of a number of pixels associated with the motion of the at least one moving object to a number of pixels associated with an entire frame.

* * * * *